United States Patent
Hosie

(10) Patent No.: US 9,998,889 B2
(45) Date of Patent: Jun. 12, 2018

(54) APPARATUS AND METHOD OF TRACKING CALL PATHS

(71) Applicant: ARM LIMITED, Cambridge (GB)

(72) Inventor: Simon Hosie, Santa Clara, CA (US)

(73) Assignee: ARM Limited, Cambridge (GB)

( * ) Notice: Subject to any disclaimer, the term of this patent is extended or adjusted under 35 U.S.C. 154(b) by 268 days.

(21) Appl. No.: 15/076,903

(22) Filed: Mar. 22, 2016

(65) Prior Publication Data

US 2017/0280307 A1    Sep. 28, 2017

(51) Int. Cl.
    H04W 4/16     (2009.01)
    H04L 5/00     (2006.01)
    G06F 11/07    (2006.01)

(52) U.S. Cl.
    CPC ............ H04W 4/16 (2013.01); H04L 5/0053 (2013.01); G06F 11/0748 (2013.01)

(58) Field of Classification Search
    CPC ... H04L 5/0053; H04L 67/34; H04L 67/2842; G06F 9/46; G06F 9/3005; G06F 9/4425; G06F 9/3861; G06F 9/4426; G06F 12/122; H04W 4/16
    See application file for complete search history.

(56) References Cited

U.S. PATENT DOCUMENTS

| | | | |
|---|---|---|---|
| 9,361,242 B2 * | 6/2016 | Manoukian | G06F 9/3005 |
| 9,424,203 B2 * | 8/2016 | Manoukian | G06F 9/3005 |
| 2005/0144606 A1 * | 6/2005 | Li | G06F 8/443 |
| | | | 717/162 |
| 2006/0253837 A1 * | 11/2006 | Hudson | G06F 11/3636 |
| | | | 717/124 |
| 2007/0169085 A1 * | 7/2007 | Griep | G06F 9/4425 |
| | | | 717/168 |
| 2009/0055813 A1 * | 2/2009 | Haber | G06F 8/4441 |
| | | | 717/158 |
| 2017/0180567 A1 * | 6/2017 | Sharma | H04M 15/8044 |

OTHER PUBLICATIONS

UK Combined Search and Examination Report dated Nov. 3, 2016 in GB 1610026.5, 6 pages.
U.S. Appl. No. 15/705,605, filed Sep. 15, 2017, Inventor: Hosie.
R. Bedichek, "Some Efficient Architecture Simulation Techniques", 1990, USENIX Conference, 12 pages.

(Continued)

*Primary Examiner* — Afsar M Qureshi
(74) *Attorney, Agent, or Firm* — Nixon & Vanderhye P.C.

(57) ABSTRACT

A data processing apparatus is provided. Call path storage circuitry stores an identifier of a call path and processing circuitry executes a current group of instructions from a plurality of groups of instructions. The processing circuitry is responsive to a calling instruction to firstly cause the processing circuitry to start executing, in dependence on the calling instruction, a next group of instructions from the plurality of groups of instructions such that the current group of instructions is added to the call path, and to secondly cause the call path storage circuitry to update the identifier of the call path, on the basis of the call path, using a compression algorithm.

20 Claims, 13 Drawing Sheets

(56) References Cited

OTHER PUBLICATIONS

J. Jean et al., "Tweaks and Keys for Block Ciphers: the TWEAKEY Framework", International Conference on the Theory and Application of Cryptology and Information Security, Dec. 2014, 18 pages.
J. Borghoff et al., "PRINCE—A Low-latency Block Cipher for Pervasive Computing Applications", ASIACRYPT'12, Dec. 2-6, 2012, 25 pages.
Qualcomm, Pointer Authentication on ARMv8.3, Design and Analysis of the New Software Security Instructions, Qualcomm Technologies, Inc., Jan. 10, 2017, 12 pages.

* cited by examiner

```
1:  uint32_t tcall(uint32_t crc, uint32_t new_lr) {
2:      crc ^= new_lr;
3:      for (int i = 0; i < 32; i++)
4:          crc = (crc & 1) ? (crc >> 1) ^ POLY : (crc >> 1);
5:      return crc;
6:  }
```

FIG. 3A

```
1:  uint32_t ret(uint32_t crc, uint32_t new_pc) {
2:      crc ^= new_pc;
3:      for (int i = 0; i < 32; i++)
4:          crc = (crc & 0x80000000) ? (crc << 1) ^ RPOLY : (crc << 1);
5:      return crc;
6:  }
```

FIG. 3B

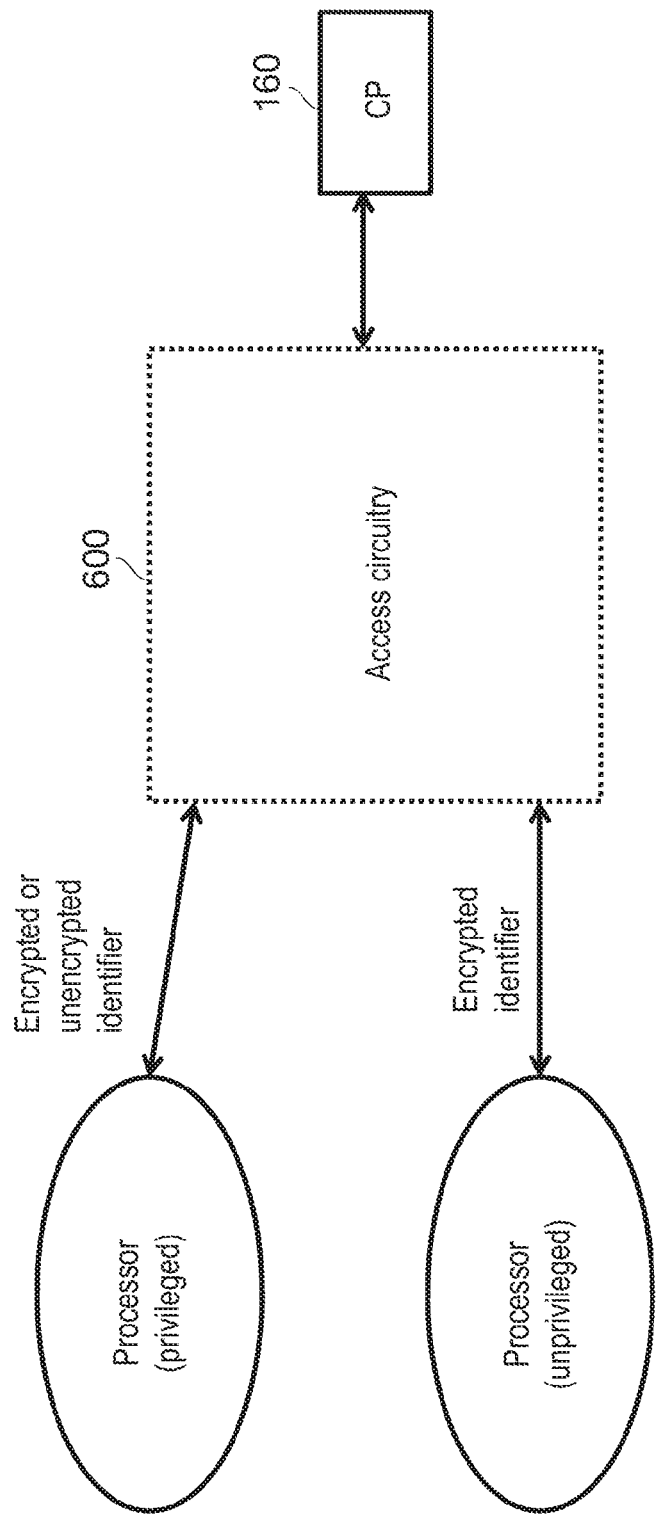

APPARATUS AND METHOD OF TRACKING CALL PATHS

BACKGROUND

Technical Field

The present disclosure relates to data processing.

Description

In a data processing apparatus, it is often useful to be able to determine the origin of a call to a subroutine or function. One way to do this is to examine the link register, which contains a return address of an instruction to execute when a function or subroutine completes. However, the use of wrapper functions means that it is often a wrapper function that calls another function. This therefore says very little about the true origin of the function call. Additionally, this information is ambiguous when it comes to recursive function calls. For example, if a function x is recursive, it could be that the link register indicates that function x was called by function x. However, this gives no indication of how many times function x was recursively called or what the original origin of the function x call was. Another option for solving this problem would be for all callers to pass an identifying handle or string whenever a function is called. However, this requires cooperation from the developers of the calling code. Furthermore, multiple pieces of software could lead to ambiguities regarding exactly which function is associated with a particular label. Yet another option is to "walk" the application stack in order to determine the sequence of functions that has been called. However, this process is very time consuming It would therefore be desirable to find some way of efficiently identifying call paths.

SUMMARY

Viewed from a first example configuration, there is provided a data processing apparatus comprising: call path storage circuitry to store an identifier of a call path; and processing circuitry to execute a current group of instructions from a plurality of groups of instructions, wherein said processing circuitry is responsive to a calling instruction to: cause said processing circuitry to start executing, in dependence on said calling instruction, a next group of instructions from said plurality of groups of instructions such that said current group of instructions is added to said call path, and cause said call path storage circuitry to update said identifier of said call path, on the basis of said call path, using a compression algorithm.

Viewed from a second example configuration, there is provided a data processing method comprising the steps: storing an identifier of a call path; executing a current group of instructions from a plurality of groups of instructions; and in response to a calling instruction: executing, in dependence on said calling instruction, a next group of instructions from said plurality of groups of instructions such that said current group of instructions is added to said call path, and updating said identifier of said call path, on the basis of said call path, using a compression algorithm.

BRIEF DESCRIPTION OF THE DRAWINGS

The present invention will be described further, by way of example only, with reference to embodiments thereof as illustrated in the accompanying drawings, in which:

FIG. 3A illustrates an algorithm for determining an identifier when making a function call;

FIG. 3B illustrates an algorithm for determining an identifier when returning from a function call;

FIG. 6 illustrates the use of access circuitry to control access to the identifier depending on a privilege mode of the data processing apparatus;

DESCRIPTION OF EXAMPLE EMBODIMENTS

Figure 1:
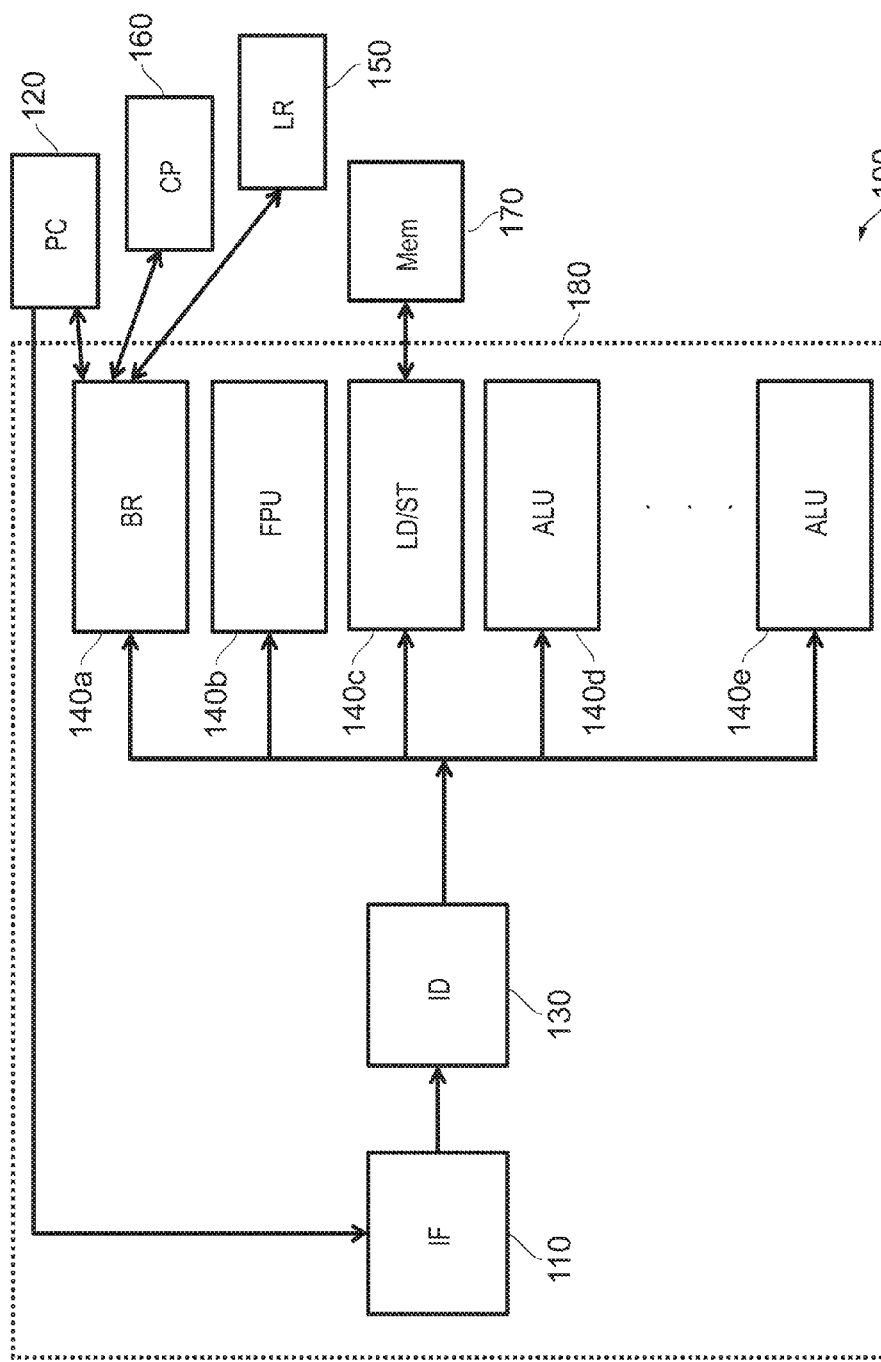
FIG. 1 illustrates a data processing apparatus in accordance with one embodiment.

Before discussing the embodiments with reference to the accompanying figures, the following description of embodiments is provided.

In accordance with one example configuration there is provided a data processing apparatus comprising: call path storage circuitry to store an identifier of a call path; and processing circuitry to execute a current group of instructions from a plurality of groups of instructions, wherein said processing circuitry is responsive to a calling instruction to: cause said processing circuitry to start executing, in dependence on said calling instruction, a next group of instructions from said plurality of groups of instructions such that said current group of instructions is added to said call path, and cause said call path storage circuitry to update said identifier of said call path, on the basis of said call path, using a compression algorithm.

The call path storage circuitry maintains an identifier of the current call path. When a calling instruction is executed by the processing circuitry, the processing circuitry starts execution a next group of instructions (e.g. a function or subroutine), thereby altering the call path to include the group of instructions (e.g. function or subroutine) that included the calling instruction. The call path storage circuitry is then updated to store the identifier of the amended (new) call path. Since an identifier of the call path is maintained, it is possible to determine the origin of a call to a function rather than simply the previous group of instructions in the call path. Similarly, it is possible to determine different degrees of recursion in the case of recursive function calls. In particular, where a function has been recursively called four times, the call path and call path identifier will differ from where a function has been recursively called three times or five times. In order to prevent the identifier of the call path becoming too big to practicably store, the identifier of the call path is produced using a compression function and the call path itself. The input to a compression function is at least as many bits as the corresponding output. Additionally, for some compression functions, at least some inputs to the compression function have more bits than the corresponding outputs. Calling instructions include those instructions that are used to cause a next group of instructions to be executed as a consequence of a function call. For example, calling instructions can include jump and branch instructions. In some embodiments, at each function call, the compression function is reapplied to the previous identifier of the call path, plus a new element. In other embodiments, at a function call, the entire new call path is directly compressed. The compression function might be a one-way compression function. In a one-way compression function, the output is of a size smaller than the input. However, it may not be possible to determine the input from the output.

In some embodiments, the data processing apparatus further comprises: return address storage circuitry to store a return address identifier associated with a previous group of instructions, wherein said processing circuitry is further responsive to said calling instruction to cause said return address storage circuitry to store a return address identifier associated with said current group of instructions; and said identifier of said call path is updated based on said return address identifier. When a calling instruction causes the flow of execution to change to a next group of instructions, a return address can be provided to the return address storage circuitry. Typically, the return address will be of the instruction after the calling instruction so that, when the next group of instructions complete, the flow of execution returns to where it left off In these embodiments, each function call in the call path is based on the return address identifier for that function call. Using the return address identifier to update the call path can be useful because the return address identifier usually differs for each calling instruction. For example, calls to function x from function y or function z or from several different locations in function z can have different return address identifiers and can therefore distinguish between the multiple function calls made within each function.

In some embodiments, the return address storage circuitry is a link register. A link register can be specifically provided to store the latest return address for a function call. In order to handle multiple nested function calls, when a function call is made, at least a subset of registers (including the link register) is stored to the application stack. The values of these registers are restored from the application stack when the subroutine completes.

In some embodiments, said processing circuitry is responsive to a returning instruction to: cause said processing circuitry to resume executing, in dependence on said calling instruction, a previous group of instructions from said plurality of groups of instructions such that said current group of instructions is removed from said call path, and cause said call path storage circuitry to update said identifier of said call path based on said call path. In such embodiments, as function calls return, the call path reduces and the identifier is adjusted accordingly. The adjustment of the identifier is achieved, in some embodiments, by storing an old version of the identifier on the application stack at each function call, and restoring it on return from each function call. In other embodiments, the adjustment of the identifier is done algorithmically based on the old version of the identifier.

In some embodiments, said compression algorithm comprises a digest algorithm. Digest algorithms (e.g. hash algorithms) are a class of compression algorithm for which it is extremely unlikely or even impossible that any two arbitrary inputs will generate the same output. Accordingly, there is a high degree of correspondence between an input and its given digest. This can be useful in a compression algorithm where the number of possible inputs is larger than the number of possible outputs.

In some embodiments, said compression algorithm is unwindable. For example, the compression algorithm may be reversible. Given an output, a rewindable or reversible algorithm makes it possible to determine the input. In some cases, a rewindable or reversible algorithm makes it possible to determine one input when given an output together with additional information. By using a reversible compression algorithm, it is possible, on returning from a function call, to determine the identifier of the revised call path based on the identifier of the previous call path. In other embodiments, rather than recalculating the identifier of the call path, it is possible to store the identifier of the call path each time a function call is made, and restore the identifier of the call path as part of the return process when the function call returns. These two alternatives provide a tradeoff between increased processing time (when determining the revised call path identifier) and increased storage requirements (when loading the revised call path identifier).

In some embodiments, said digest algorithm comprises a Feistel network that uses said digest algorithm. A Feistel network is a particular type of structure used in encoding. In particular, in a Feistel network, the methods used for encryption and decryption may be very similar or even identical, thereby enabling an encoded message to be easily decoded. Broadly speaking, a Feistel network takes a portion of an input, which is hashed with a new value (i.e. the new addition to the call path). The result is then used to permute the remaining bits from the input. This effectively creates a constant rotating window in which a set of unmodified bits changes position at each iteration. This makes it possible to immediately determine previous call path identifiers, without having to rewind or decode the current identifier. In other embodiments, the digest algorithm may comprise a cyclic redundancy check (CRC) algorithm.

In some embodiments, said identifier of said call path at least pseudo-uniquely identifies said call path. For example, the identifier of the call path either pseudo-uniquely identifies said call path or uniquely identifies the call path. Pseudo-uniquely identification relates to the idea that although it is possible for two call paths to share the same identifier, mathematically, the probability of this happening is extremely low. For example, the probability may be sufficiently low that in the normal course of operation, it will not be possible to find two call paths that share the same identifier.

In some embodiments, said identifier of said call path uniquely identifies said call path. In other words, there is a one-to-one mapping between a call path and the associated identifier of that call path.

In some embodiments, the data processing apparatus further comprises further storage circuitry, wherein said processing circuitry is responsive to a context switch operation to: save said identifier of said call path from said call path storage circuitry to said further storage circuitry; and restore a further identifier of a further call path from said further storage circuitry to said call path storage circuitry. In a context switch, one thread of operation is suspended and another thread of operation is resumed (or started). The contents of the call path storage circuitry associated with the resumed/started thread of operation must therefore be loaded from the further storage circuitry, which could be a main memory in which an application stack is kept. Furthermore, the call path identifier associated with the suspended thread of operation must be saved to prevent it from being overwritten by the resumed/started thread of operation.

In some embodiments, the data processing apparatus further comprises access circuitry to control access to said call path storage circuitry, wherein said digest algorithm is a cryptographic digest algorithm; said processing circuitry is to operate in a current privilege mode out of a plurality of privilege modes; and said access circuitry controls access to said call path storage circuitry dependent on a current privilege mode of said processing circuitry. In such embodiments, access to the call path storage circuitry is controlled via access circuitry. In particular, access to the call path storage circuitry depends on a current privilege mode in which the processing circuitry operates. The plurality of privilege modes could, for instance, be a hierarchy of privilege levels. Alternatively, the plurality of privilege modes could have completely different capabilities, rights, or privileges, some of which might be able to access the call path storage circuitry (perhaps in a restricted manner). In some embodiments, said digest algorithm is a cryptographic digest algorithm. In a cryptographic digest algorithm, the algorithm is such that it is impossible, or at least mathematically improbable for a person to force a collision—that is, to find two inputs that generate the same output. If a collision can be forced, then it may be possible for a user to learn how to freely encrypt chosen values, which would allow an identifier of an arbitrary call path to be stored in the call path storage circuitry.

In some embodiments, when said processing circuitry accesses said access circuitry whilst said current privilege mode is less than a predefined privilege mode, said access circuitry is to provide an encrypted version of said identifier of said call path instead of said identifier of said call path. By providing an encrypted version of the identifier, it is still possible to compare two encrypted identifiers to determine if the call path is the same, but it is not possible to decode the elements of the call path. The access circuitry can provide the encrypted version of the identifier of the call path by storing the identifier in a decrypted form and then performing encryption on the identifier when requested by the processing circuitry whilst in a privilege mode that is less than the predefined privilege mode.

In some embodiments, when said processing circuitry accesses said access circuitry whilst said current privilege mode is greater than or equal to said predefined privilege mode, access circuitry is to provide said identifier of said call path and said encrypted version of said identifier of said call path. Consequently, when in a higher privilege mode, it is possible to obtain either the identifier of the call path or an encrypted version of the identifier of the call path, as required by the processing circuitry.

In some embodiments, said next group of instructions comprises a subset of instructions that compares said identifier of said call path to one or more permitted identifiers associated with said next group of instructions; and in response to said identifier of said call path corresponding with none of said one or more permitted identifiers, said processing circuitry triggers an error handling response.

Such embodiments make it possible to control access to a particular function. In particular, it is possible to check that entrance into a particular function has not come via an unexpected route—as can occur if an attacker exploits a buffer overflow error in order to cause the code to jump to a particular piece of code. The permitted identifiers could represent identifiers of call paths that are allowed access to a special or restricted group of instructions. A subset of instructions (those at the beginning of the group) compares the call path identifier to the list of permitted identifiers. If there is no match, i.e. if the current call path is not part of an "allowed" list then an error handling response can be triggered. This might, for example, cause the application to throw an exception. In some cases, the software being executed might terminate. The attempt to access the group of instructions could be logged. The error handling response could also involve denying access to the group of instructions, for example, by directly returning to execute the previous group of instructions.

In some embodiments, said data processing apparatus further comprises analysis circuitry to analyse a data structure comprising a set of resource allocations and for each resource allocation in said set, to output an associated identifier of a call path, wherein said processing circuitry is responsive to an allocation instruction to store a resource allocation in association with said identifier of said call path, in said set of resource allocations; and said processing circuitry is responsive to a deallocation instruction to remove a resource allocation from said set of resource allocations. In this way, when allocating resources, it is possible to determine at the end of executing a program, the call path identifiers associated with resources that were never deallocated or freed. Such information can be used to help resolve memory leaks as a consequence of memory not being correctly freed or to help resolve blocking in respect of resources that were locked and never unlocked.

In some embodiments, the data processing apparatus further comprises configuration storage circuitry to store one or more parameters that define a behaviour of said processing circuitry; and tuning circuitry to alter said one or more parameters, wherein said processing circuitry executes instructions in said plurality of groups of instructions in accordance with said behaviour; and said tuning circuitry alters said one or more parameters in dependence on said identifier of said call path. Sometimes the processing circuitry operates in accordance with one or more parameters. For example, the duration given to a process in a preemptive scheduler may be defined a parameter. Numerous other examples may occur with respect to memory management, speculation, instruction issuing, and so on. In each case, there is often a trade-off to be made. For example, in a preemptive scheduler, giving each process larger time slices means that each process can run for longer. If a process has access to a shared resource such as a lock, it is more likely that the process will relinquish control of the lock before its time slice expires. However, giving each process larger time slices means that each other process must wait for longer in between turns. By performing heuristics based on the call path identifier, it is possible to generalise or make assumptions about the behaviour of the processing circuitry. For example, if it is determined, over a period of time, that when the call path identifier has a particular value then an accessed lock will be held for a long period of time, then in the future, when the call path has that identifier, the default time slice length can be increased. Similarly deductions can be made for other call path identifiers and for other parameters of behaviours of the processing circuitry. In this manner, the overall performance of the processing circuitry can be improved.

In some embodiments, said processing circuitry is to perform a debugging process on software comprising said plurality of groups of instructions; and said processing circuitry is responsive to a breakpoint event to compare said identifier of said call path to one or more breaking identifiers and, in response to said identifier corresponding with one of said one or more breaking identifiers, suspending execution of said software. Breakpoint events are events that cause the execution of software to be suspended. Often this allows memory and/or variables to be examined, or for the software execution to be stepped through an instruction at a time in order to monitor the software's behaviour. This can aid in debugging. A breakpoint event can include both explicitly specified breakpoints in the software to be executed as well as breakpoints that are specified in a hardware device. One difficulty with using breakpoints is that a breakpoint may be encountered numerous times when the programmer only wishes the breakpoint to cause execution of the software to be suspended in a particular situation. For example, the programmer may only be interested in examining the state or behaviour of the processing circuitry when a particular group of instructions is entered into from a particular call path. In these particular embodiments, it is possible to tie the functioning of a breakpoint to a current call path identifier. For example, only when the call path identifier matches a set of known breaking identifiers will the breakpoint, when encountered, cause the software to be suspended. In other events, no suspension will occur.

In some embodiments, said data processing apparatus further comprises performance measuring circuitry to provide a performance metric related to execution of said current group of instructions by said processing circuitry while said identifier of said call path has a specific value; and further storage circuitry to store said performance metric in association with said specific value. In this manner, it is possible to determine how particular groups of instructions perform based on the call path identifier. For example, it may be possible to determine, based on the origin of a function call, why a particular function performs well or poorly. The performance metric could relate to processor or memory usage. For example, the performance metric could relate to the number of processing cycles used, the amount of memory used, the performance of the memory used such as whether the memory had to be paged in.

In some embodiments, the data processing apparatus further comprises cache circuitry for storing a plurality of counters each associated with a call path, wherein said cache circuitry is indexed by said identifier of said call path; profile circuitry to determine, each period, said identifier of said call path, to index into said cache with said identifier of said call path to obtain a counter associated with said call path, and to increment said counter associated with said call path, wherein when said identifier lacks an entry in said cache, said processing circuitry performs a stack walk in order to determine said call path and updates said cache circuitry to store a counter in association with said call path. Timer-based profiling makes use of a timer to determine, each time the timer fires, which group of instructions (function) is mid-execution. One difficulty with this process is that determining the current function requires a stack-walk to take place, which is time consuming In the current embodiments, each time a stack walk takes place, the current function call is stored together with the call path identifier. Thereafter, if the call path identifier is seen again, it is possible to determine the current function call without having to perform the stack walk again. This speeds up the profiling process, with the result that the profiling process can be less intrusive into the software being profiled.

Particular embodiments will now be described with reference to the figures.

FIG. 1 illustrates a data processing apparatus or processor 100 in accordance with one embodiment. The data processing apparatus 100 comprises a pipeline 180, which includes an instruction fetch unit 110. The instruction fetch unit fetches an instruction to be executed, for example from main memory. The instruction that is fetched depends on the value held in a program counter register 120. Having fetched the instruction, it is decoded by an instruction decode unit 130, which is the next unit in the pipeline 180. This results in one or more signals being generated, the signals corresponding with the decoded instruction, and being transmitted to one or more execution units 140a-140e, which are the next elements of the pipeline 180. These might include one or more of a branch unit 140a, which instructions that alter the flow of control of the program such as calling instructions (e.g. branch and jump instruction), a floating point unit 140b for handling floating point arithmetic, a load/store unit 140c for accessing a memory hierarchy 170, or an arithmetic logic unit 140d, 140e for performing integer arithmetic and logic. It will be appreciated that a data processing unit 100 could have such units in different combinations and could even include different execution units altogether. For example, the embodiment shown in FIG. 1 includes a pair of ALUs 140d, 140e.

In any event, a function call causes the flow of control of the program to change. This flow of control might change as part of, for example, a branch instruction that causes a different series of instructions to be executed. In the data processing apparatus of FIG. 1, a branch unit 140a can handle such an instruction and can cause the value in the program counter register 120 to be updated accordingly. In addition, the value held in a link register 150 is updated to refer to a program counter value of an instruction to return to once the current function call has completed. The code within a function call could itself call further functions. This can result in a call path, i.e. a series of functions that must be passed through in order to arrive at the presently executing code. In view of the fact that the link register 150 typically only stores a single return address, when a function call is made, the previous value of the link register 150 is stored on the application stack in main memory, to be restored when execution returns to the current function.

For a variety of reasons it is often useful to know or at least identify the current call path (e.g. to perform a comparison). This can potentially be achieved by analysing the application stack in main memory. However, this requires interpreting the values stored in the stack. Furthermore, accesses to main memory can be slow and accordingly, determining the current call path in this manner can be time consuming. In the embodiment of FIG. 1, a call path identifier register 160 provides a call path identifier that pseudo-uniquely identifies the current sequence of function calls that has been made. This is achieved by, at each function call, performing a hashing operation using the previous value of the call path identifier and a value of the link register in order to arrive at a new call path identifier. Since the link register value changes for each different function call (even within a single function), a sequence of link register values uniquely corresponds with a particular series of function calls. In this embodiment, the hash function is a compression function and accordingly, the amount of storage space used to represent the call path itself can be reduced or compressed. The process of hashing means that the identifier might only pseudo-uniquely identify the call path. However, this will depend on the hashing function used and in some cases, the hashing function might still result in a one-to-one unique mapping between the identifier and the call path.

In the embodiment shown in FIG. 1, the hash function is rewindable (e.g. reversible) so that, given the current link register value, it is possible to undo the hash and thereby determine the identifier of the call path for the function that called the present function. Accordingly, as function calls are made and returned, the identifier corresponds with the current call path.

In order to prevent the call path identifier from becoming destabilised, it can be important to define the behaviour of the data processing apparatus 100 in certain circumstances. Firstly, a longjmp function can be used for exception handling. This allows a particular location in the program to be stored and, in the event of a panic or error occurring, the program will return to that part of the program. This can result in the actual call path suddenly and unexpectedly changing. In order to resolve this situation, the values of the registers (including the call path identifier register) can be saved at the time that the location in the program is stored and then re-loaded when the program jumps back to that point. Secondly, when context switching in a cooperative scheduler, two functions are typically called. One of them saves current values of the registers for the active thread. The second loads values of the registers for the new thread. However, if the saving function is part of the call path identifier that is saved, this will cause a problem when the load function subsequently restores the call path identifier, since the call path will indicate that the current function is the save function, when it is actually the load function. In order to resolve this problem, a single save and load function can be provided, thereby overcoming the problem.

In some embodiments, the above functionality can be selectively disabled so that call path identifiers are not maintained. In some embodiments, it is possible to disable or enable this functionality around specific code blocks, for example, by issuing a specific instruction to the data processing apparatus 100.

Figure 2:
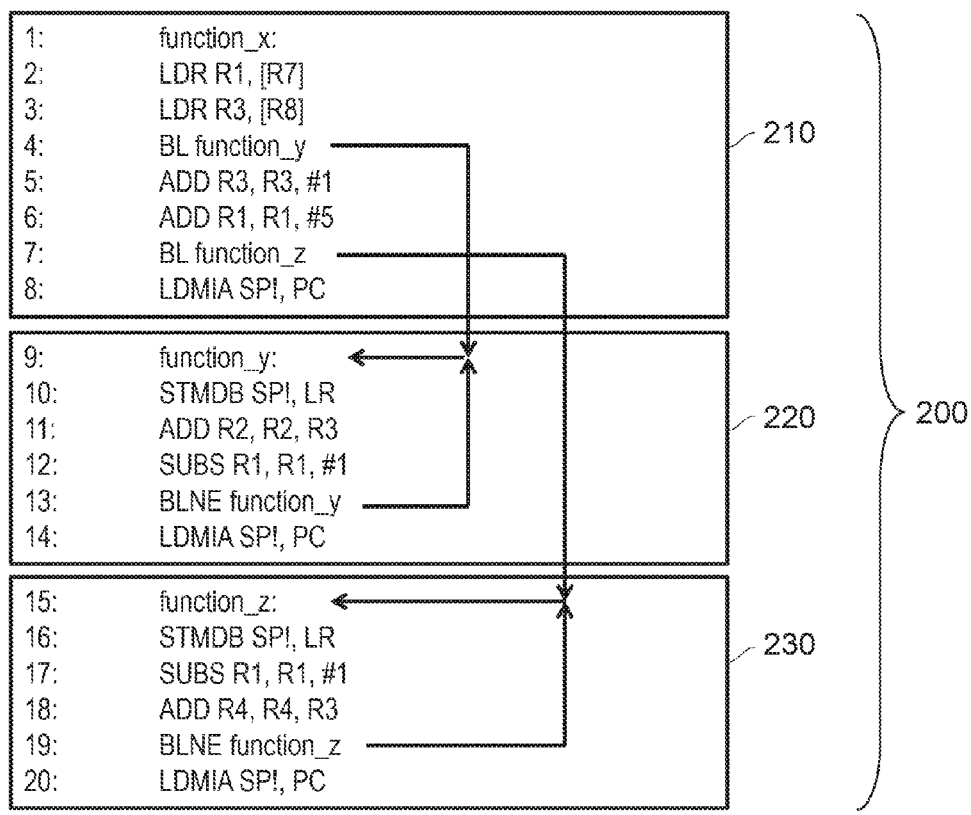
FIG. 2 illustrates how program flow changes for a plurality of functions that call one another.

FIG. 2 illustrates how program flow changes for a plurality of functions that call one another. FIG. 2 shows a number of instructions 200 written in assembly code and grouped into three groups or functions x, y, and z 210, 220, 230. Within each of the functions 210, 220, 230, various function calls are made. For example, function x calls function y followed by function z. Function y recursively calls itself numerous times before returning to function x. Similarly, function z recursively calls itself numerous times before returning to function x.

At each function call, the link register 150 is set to the address of the instruction to return to, once the function call has completed. For example, in this embodiment, the function call that occurs at line 4 will cause the link register 150 to acquire a value of 5 indicating that when the function call to function y returns, the instruction on line 5 is the next instruction to execute.

Similarly, for each function call, the call path identifier register 160 is updated to hash the current value of the call path identifier register 160 with the new value of the link register 150. For example, while in function x, there is no call path per se and so the call path identifier register 160, in this embodiment, is 0. At line 4, when function y is called, the value in the program counter register 120 becomes 9 and execution continues from line 9. As previously described, the link register 150 becomes 5. The call path identifier register 160 thereby acquires a value of hash(0, 5).

At line 13, the function y recursively calls itself. The old version of the link register 150 (5) is stored to an application stack in main memory 170 for later restoration and the program counter changes to 9 thereby causing the program to start executing function y again. The link register is changed to 14, which indicates that when this function call returns, the program counter should change to 14 to execute the instruction on that line. The call path identifier register 160 acquires a value of hash(hash(0, 5), 14). Similarly, when function y recursively calls itself again, the call path identifier register 160 acquires a value of hash(hash(hash(0, 5), 14), 14). By hashing each value of the link register during each function call, it is possible to distinguish a call path identifier in a recursive function depending on the depth of the recursion. Similarly, multiple entry points to the same function can be distinguished by the fact that each entry point will have a different link register value and accordingly, the overall hash will be different. For example, if function z's recursive function call to function z on line 19 was instead a function call to function y, then the resulting call path identifier on entry to function y would be hash (hash(8, 0), 20). This contrasts with the above example, in which the identifier has the value hash(hash(0, 5), 14). Similarly, it is possible to distinguish multiple function calls from within the same function. For example, the call path identifier for the function call on line 4 differs from that on line 7. These are hash(0, 5) and hash (8,0) respectively.

When a function call returns, the call path identifier is unwound. For example, consider the case when function y returns having a call path identifier of hash(hash(hash(0, 5), 14), 14). The current value of the link register is used to reverse the hash thereby resulting in a call path identifier of hash(hash(0, 5), 14). Similarly, execution will return to line 14. The previous version of the link register is then retrieved from the application stack, which is used for subsequent rewinding of the call path identifier value and also for returning from previous function calls.

FIG. 3A illustrates an example hashing function. In particular, FIG. 3A shows an example algorithm for performing the cyclic redundancy check (CRC) algorithm. The algorithm takes the previous value of the CRC (crc) and the new element of the call path (e.g. the link register value—new_lr) and returns a hash of the two inputs. At line 2, the previous value of the crc is exclusive-ORed (XOR'd) using the new link register value. As will be appreciated by the skilled person, the XOR operation is reversible. In other words A XOR B XOR B returns A. Lines 3 and 4 iterate through the bits of the crc, performing a "XOR division" using a polynomial (POLY). Given that the end result, which is returned in line 5, corresponds with a remainder of the "XOR division" operation using the polynomial, it will be appreciated that the output will be less than the polynomial. Accordingly, there is a greater chance of a collision occurring (two inputs having the same output) when a smaller polynomial is used. The task of selecting a suitable polynomial will be known to the skilled person.

FIG. 3B shows an algorithm to unwind or reverse the hash. The inputs to the function are the crc and new_pc, which is the new program counter after the function call returns (or, alternatively, the value of the link register immediately before the function call returns). Lines 2 and 3 of the algorithm iterate through the bits of the crc. At each iteration, if the bit being considered is a '1' then a left shift occurs and the result is XORed with RPOLY, otherwise a left shift occurs. Once this is done, at line 4, the end result is XORed with new_pc to give the result. The value RPOLY is a derivative of POLY, which is used to form the CRC in the first place. In particular, RPOLY is the result of left shifting POLY by one bit.

Furthermore, POLY in the above implementations disregards the least significant bit, and RPOLY disregards the most significant bit. Hence, for a polynomial of the form 1abcdef1, POLY is '1abcdef' and RPOLY is 'abcdef1'. In other words, for a 32-bit polynomial:

$$RPOLY=(POLY*2+1)\&0xffffffff;$$

Figure 4A:
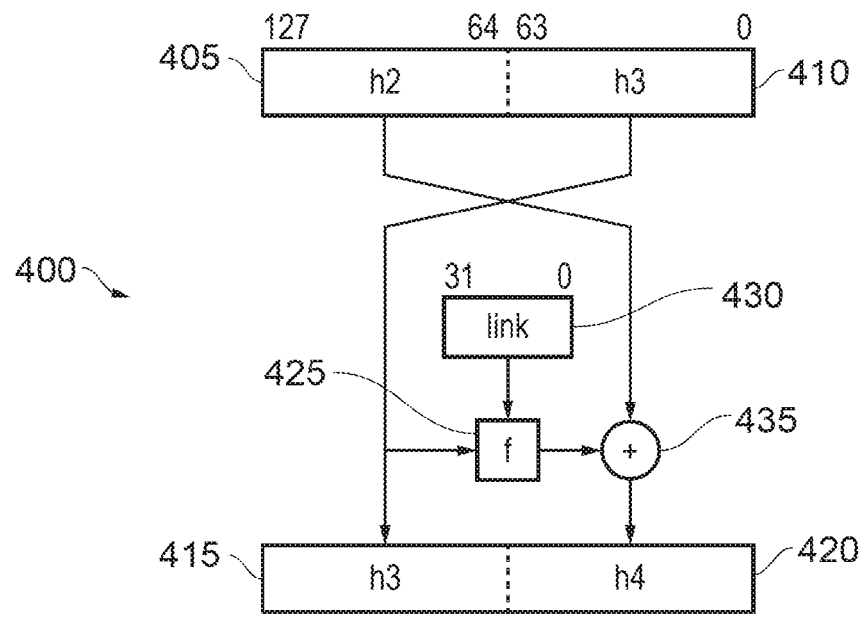
FIG. 4A schematically illustrates circuitry for determining an identifier using a balanced Feistel network when making a function call.

FIG. 4A schematically illustrates circuitry 400 for producing an identifier using a balanced Feistel network. Using a Feistel network has the advantage that it is possible to identify a previous call path identifier, without having to perform decoding or rewinding on the identifier of that call path. In the embodiment of FIG. 4A, the input 405, 410 is 128 bits in length and is made up of two elements—h2 405 and h3 410. The output 415, 420 is also 128 bits in length and is made up of two elements h3 and h4. The second element h3 of the input 410 not only makes up the first element of the output 415, but is also itself hashed in a hashing unit 425 together with an input link register value 430, which is 32 bits in length. The output of the hashing unit 425 is input to an XOR unit 435 together with the first element h2 of the input 405. The output of the XOR unit 435 forms the second element h4 in the output 420.

Figure 4B:
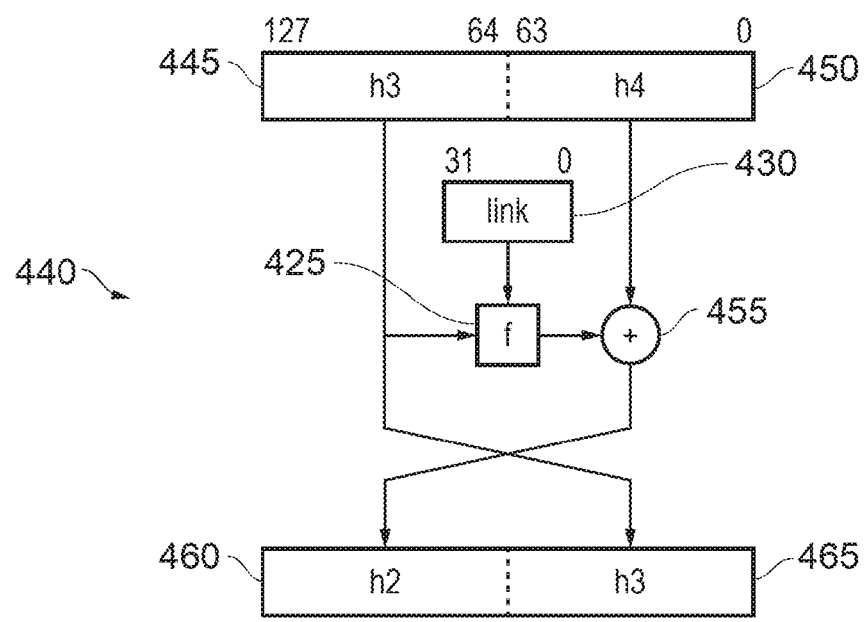
FIG. 4B schematically illustrates circuitry for determining a identifier using a balanced Feistel network when returning from a function call.

FIG. 4B schematically illustrates circuitry 440 for rewinding or reversing an identifier using a balanced Feistel network. In the embodiment in FIG. 4B, the input 445, 450 corresponds to the output of the example shown in FIG. 4A. In particular, the input 445, 450 is made up of a first element 445 h3 and a second element 450 h4. The first element of the input h3 445 is hashed using a hash unit 425 together with the input link register value 430. Note that since the same hash operation that was performed in the circuitry 400 for producing the identifier, namely hash(h3, link), the same hash unit that implements the same hash function as using in the producing circuitry 400 can be used in the rewinding/reversing circuitry 440. The output of the hash unit 425 in the rewinding/reversing circuitry 440 is provided to a XOR unit 455, together with the second element of the input h3 445. The output of the XOR unit 455 becomes the first element h2 of the output 460. Meanwhile, the first element h3 of the input 445 is directly provided as the second element h3 of the output 465.

In each of the embodiments shown in FIGS. 4A and 4B, each of h2, h3 and h4 can be used as an identifier of the current call path. In this way, the output 415, 420 in FIG. 4A makes it possible to determine not only the identifier h4 420 of the current call path but also the identifier h3 415 of the call path that called the current function.

Figure 5A:
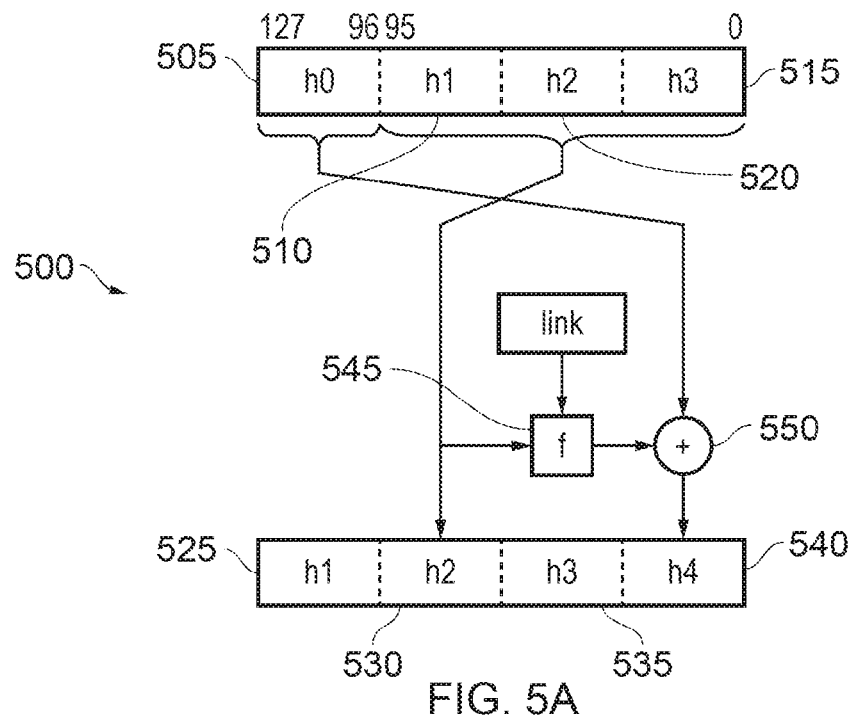
FIG. 5A schematically illustrates circuitry for determining an identifier using an unbalanced Feistel network when making a function call.

FIG. 5A schematically illustrates circuitry 500 for producing an identifier using an unbalanced Feistel network. The network is said to be 'unbalanced' because the part of the input that is hashed is a different size to the part that is XORed. The circuitry 500 is substantially the same as the circuitry for producing an identifier using an unbalanced Feistel network 400. The significant difference is that the input 505, 510, 515, 520 is made from four elements h0, h1, h2, and h3. In this case, the second, third and fourth elements h1, h2, and h3 are provided as the first three elements h1, h2, and h3 of the output 525, 530, 535 and are provided to the hash unit 545. Meanwhile, the first element h0 of the input 505 is passed to the XOR unit 550 together with the output from hash unit 545.

Figure 5B:
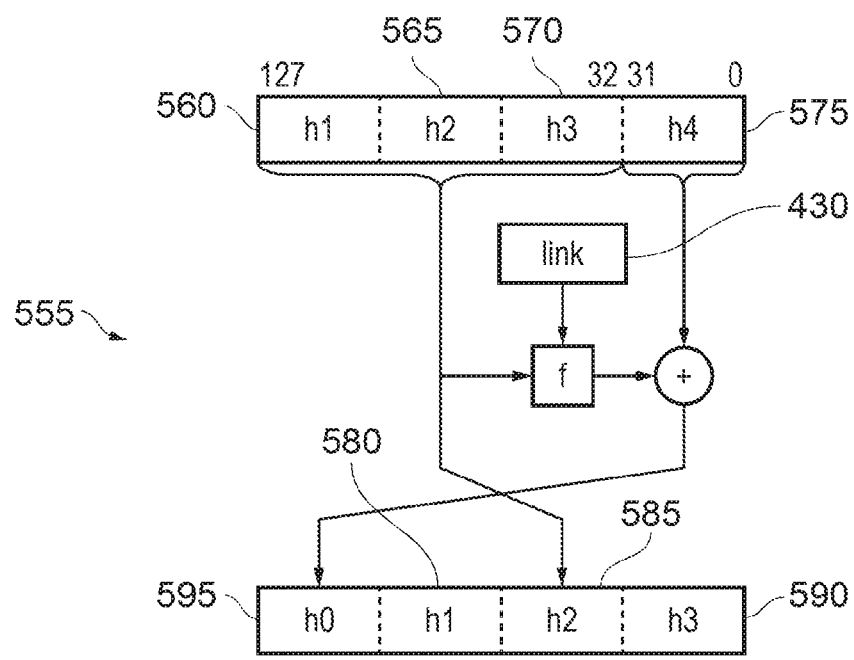
FIG. 5B schematically illustrates circuitry for determining an identifier using an unbalanced Feistel network when making a function call.

FIG. 5B schematically illustrates circuitry 555 for restoring/rewinding an identifier using an unbalanced Feistel network. Again, the circuitry 555 is substantially the same as the corresponding circuitry 4B for use in a balanced Feistel network. However, again, the input comprises four elements h1, h2, h3, and h4 560, 565, 570, 575 and three of these elements—namely h1, h2, and h3 560, 565, 570 directly form the second, third and fourth elements h1, h2, and h3 of the output 580, 585, 590. The first element h0 of the output 595 is similarly arrived via a XOR operation.

Note that in the embodiments of FIGS. 5A and 5B, it is possible to determine not only the call path identifier for the current function (e.g. h4 540), but also that of the calling function (h3 535) and the calling function of that function (h2 530) and the calling function of that function (h1 525). To determine earlier identifiers, it is necessary to perform rewinding or reversing. In other embodiments, however, it is possible to use multiple elements as the identifier and doing so can reduce the chance of collisions. For example, the combination of h3 and h4 525, 540 could be considered as the identifier of the call path, whilst h2 h3 530, 535 could be considered as the identifier of the previous function's call path.

FIG. 6 schematically illustrates an embodiment in which access circuitry 600 is used to control access to the call path identifier register 160. In this embodiment, the data processing apparatus 100 can operate in a plurality of different modes including a supervisor mode that is more privileged than an application mode. The call path identifier register 160 is accessed via the access circuitry 600. When the processor 100a is in a privileged mode of operation, the processor 100a is able to retrieve either an encrypted version of the identifier or an unencrypted version of the identifier. However, when the processor 100b is in a less privileged mode of operation such as the application mode, the processor is only able to obtain an encrypted version of the identifier. In this embodiment, the access circuitry 600 takes care of encrypting the identifier where necessary, such that an unencrypted version of the identifier is stored in the call path identifier register 160.

In such an embodiment, if a cryptographic digest function is also used to produce the identifier, such that the call path cannot be trivially determined or validly modified then it is possible to use the identifier of the call path as a security mechanism in software. In particular, access to particular software functions can be controlled such that the function can only be validly entered into if the call path identifier corresponds with one of several known valid call paths. If entry into the function is forced by some other mechanism, for example, by exploiting a buffer overflow error in the code, then the call path will not match one of the known valid call paths and an error condition can be thrown—such as the software terminating or raising an exception. The call path identifier is encrypted while in an application mode so that a malicious user cannot also decrypt and edit the call path identifier to one of the valid values prior to forcing the flow of execution into the restricted function. In some embodiments, the software that runs in the supervisor mode (e.g. an operating system) could disable this protection altogether, such that even in the application mode it is possible to access the unencrypted identifier. This can be useful if power-saving becomes important.

Figure 7:
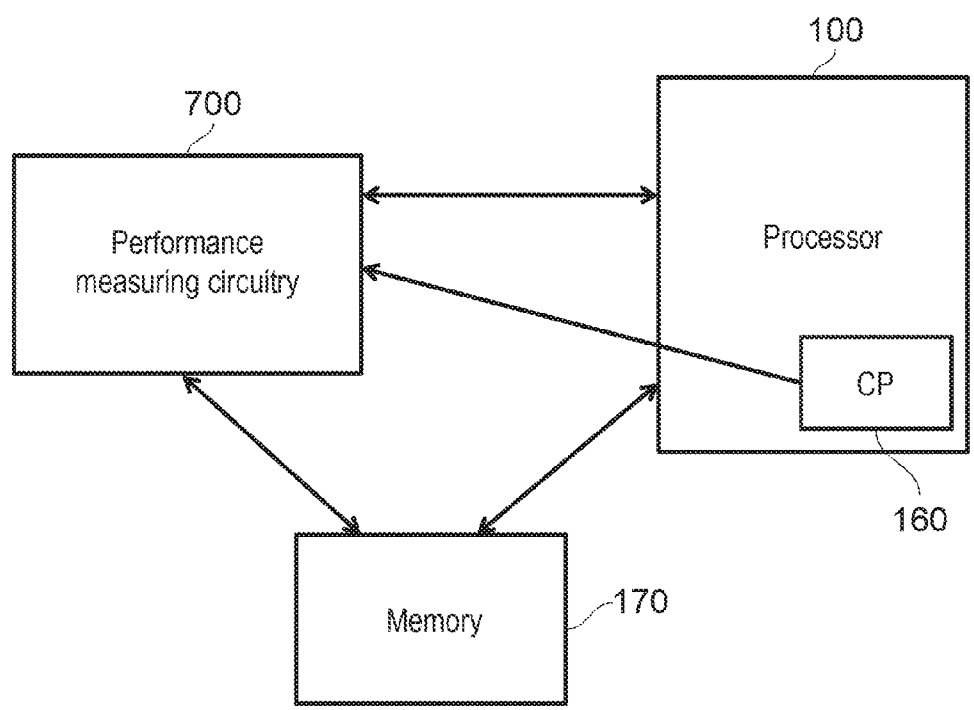
FIG. 7 schematically illustrates an embodiment in which the identifier of a call path can be used for performance measurement.

FIG. 7 schematically illustrates an embodiment in which performance measuring circuitry 700 uses the identifier of the call path to perform performance analysis. The performance measuring circuitry 700 determines, from the processor 100, the level of resource usage. This information is stored in combination with a current value stored in the call path identifier register 160 in main memory 170. By repeatedly taking readings, it is possible to determine, on average, the resources used by particular functions.

Figure 8:
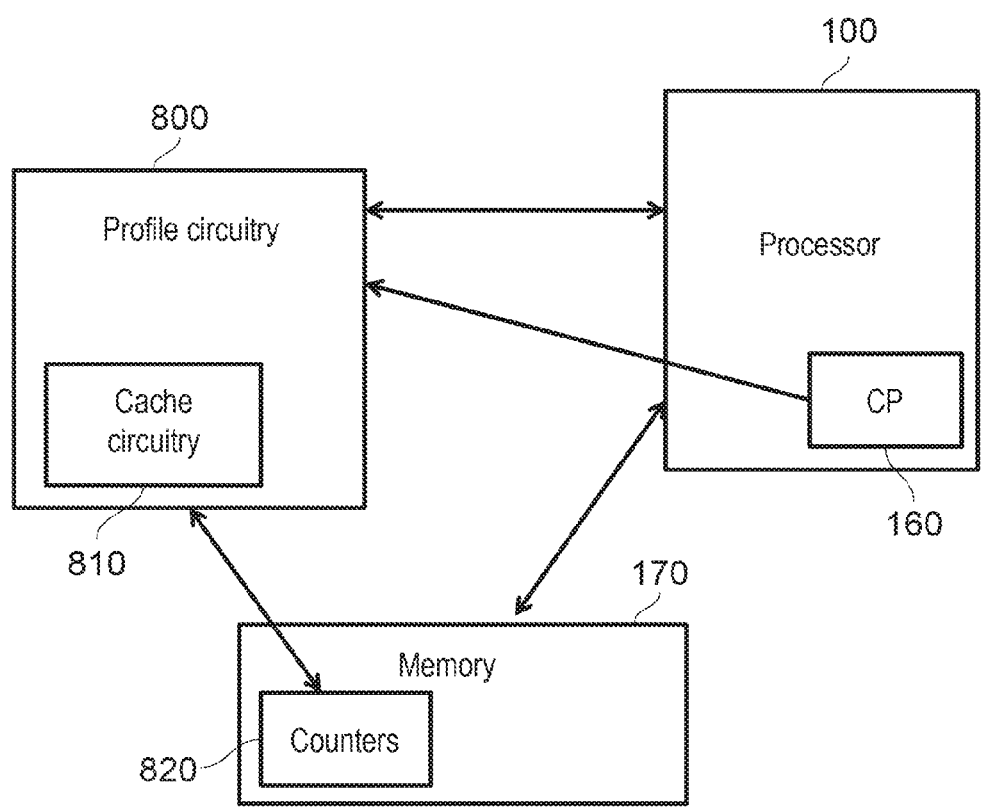
FIG. 8 schematically illustrates an embodiment in which the identifier of a call path can be used for profiling.

FIG. 8 schematically illustrates profile circuitry 800 that periodically performs profiling based on a value held in the call path identifier register 160. In this embodiment, every period of time, the profiling circuitry determines the current call path. This is carried out by first analysing a value of the value held in the call path identifier register 160 to determine if the value has been encountered before. If so, the profile circuitry 800 consults the cache circuitry 810 to determine the corresponding call path. If the value has not been encountered before then the profile circuitry 800 performs a stack walk on the application stack associated with the current process, in order to determine the current call path. This call path is then stored in association with the call path identifier in the cache circuitry 810. In either event, once the current call path is known, a set of counters 820 stored in main memory 170 is accessed and a counter associated with the current call path is incremented by 1 (or set to 1 if no such counter previously existed). The execution of the underlying software then continues. Accordingly, it is possible to reduce, over time, the time taken to perform stack walks. As each call path is encountered the appropriate call path can be referenced from the cache rather than being determined on-the-fly, which can be time consuming and wasteful of processor resources.

Figure 9:
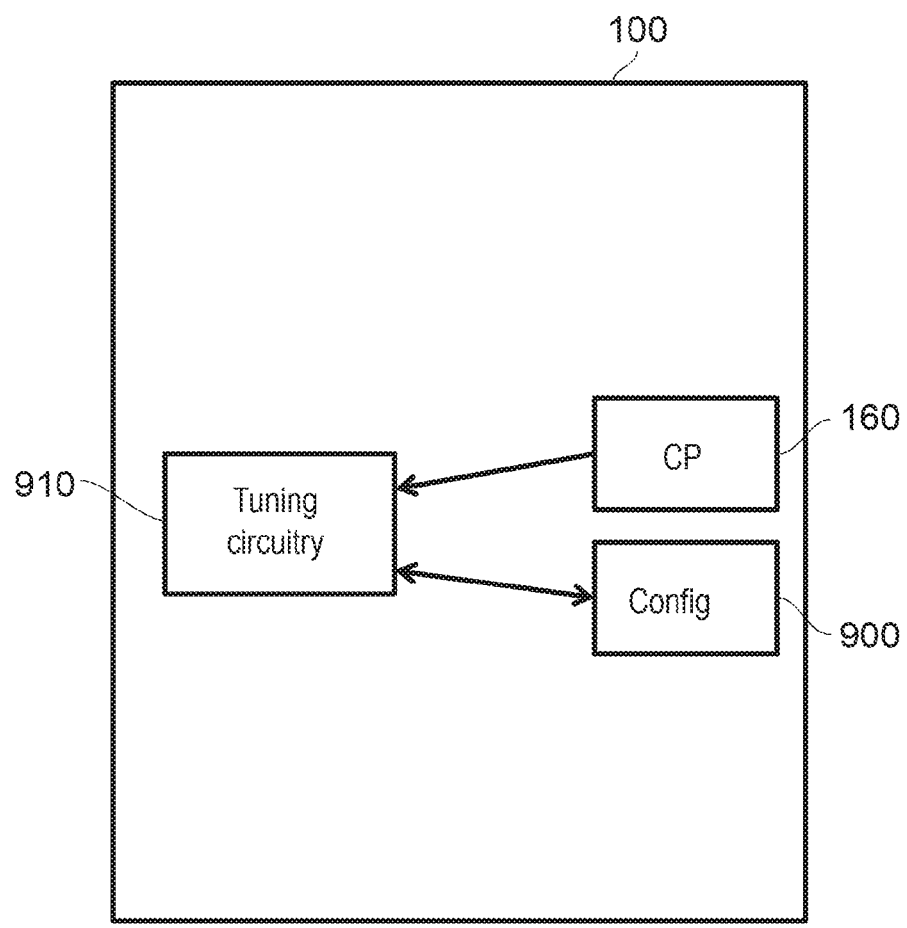
FIG. 9 schematically illustrates an embodiment in which the identifier of a call path can be used in heuristics.

FIG. 9 schematically illustrates an embodiment in which a behaviour of the processor 100 is varied in dependence on a value stored in the call path identifier register 160. In this embodiment, the precise behaviour of the processor 100 is controlled by one or more variables stored in one or more configuration registers 900. For example, these variables may control the length of time for which processes execute in a preemptive scheduler. The processor 100 includes tuning circuitry 910, which uses heuristics in order to determine appropriate values for the variables in dependence on a value held in the call path identifier register 160. For example, over a period of time, the tuning circuitry 910 may determine that using a default time slice length for most call paths is acceptable. However, for a particular call path A that regularly occurs, a longer lock time is needed in order to allow an active process to relinquish access to the lock. Accordingly, after a suitable learning period, the tuning circuitry will enable an extension to the time slice length in dependence on the value of the call path. For example, when the call path is A, the longer time slice will apply, otherwise the default time slice will apply. Alternatively, in some other embodiments, the default time slice will apply, but the time slice will be extended if the call path is A and if a shared resource (such as a lock) is currently in use by the active process. It will be appreciated by the skilled person that such parameters could include any situation in which a trade-off occurs in respect of how efficiently the processor functions. For example, such parameters could relate to memory management, speculation, instruction issuing, and so on.

Figure 10:
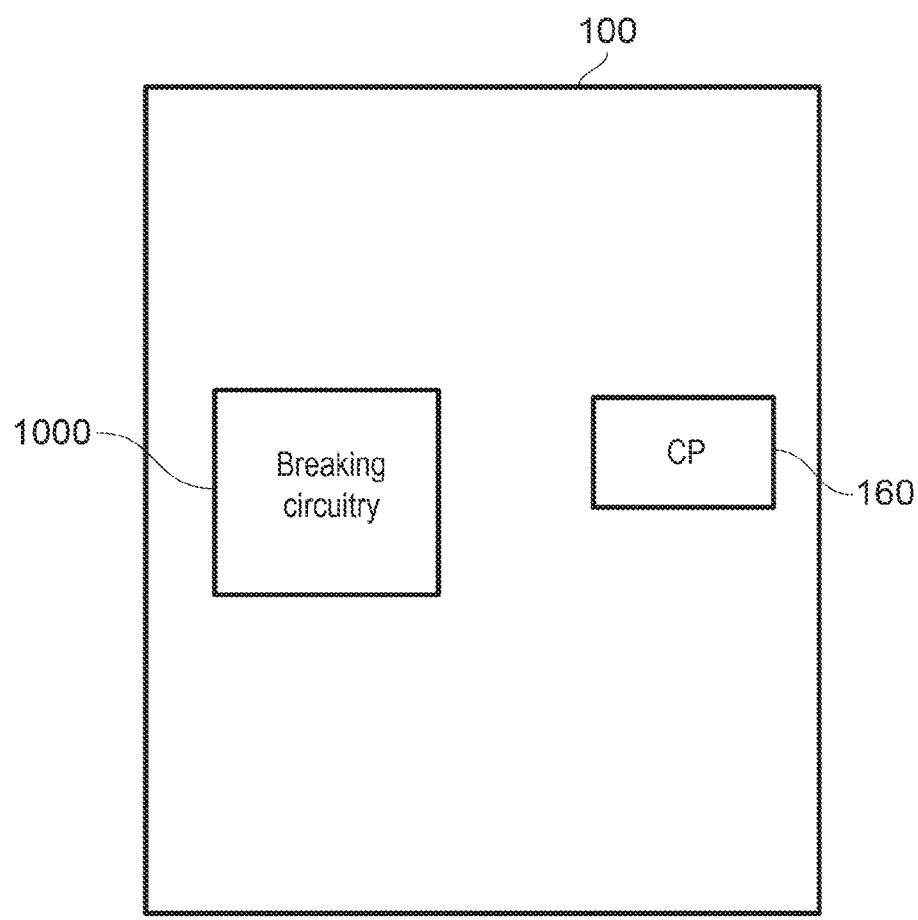
FIG. 10 schematically illustrates an embodiment in which the identifier of a call path is used for debugging FIG. 11 schematically illustrates an embodiment in which the identifier of a call path is used for assessing resource allocations.

FIG. 10 schematically illustrates an embodiment in which breakpoint filtering can be achieved. A breakpoint represents a point in a piece of code at which the execution of that code must suspend. This allows a programmer to examine the behaviour of the code, by stepping through it one instruction at a time and by examining the contents of memory and/or particular variables. A breakpoint event occurs when either a breakpoint is encountered, or when the software is explicitly made to stop at a particular point, e.g. by breaking circuitry 1000, which comprises a list of instructions at which breaks should occur. In this embodiment, the code will only suspend if the call path identifiers matches a provided set of breaking identifiers. In this way, the code can be made to suspend on in particular situations. For example, if it is known that a particular function behaves incorrectly when called from a particular origin, it is possible to target that specific origin rather than repeatedly suspending and resuming execution of the code until the function is called from the origin of interest.

Figure 11:
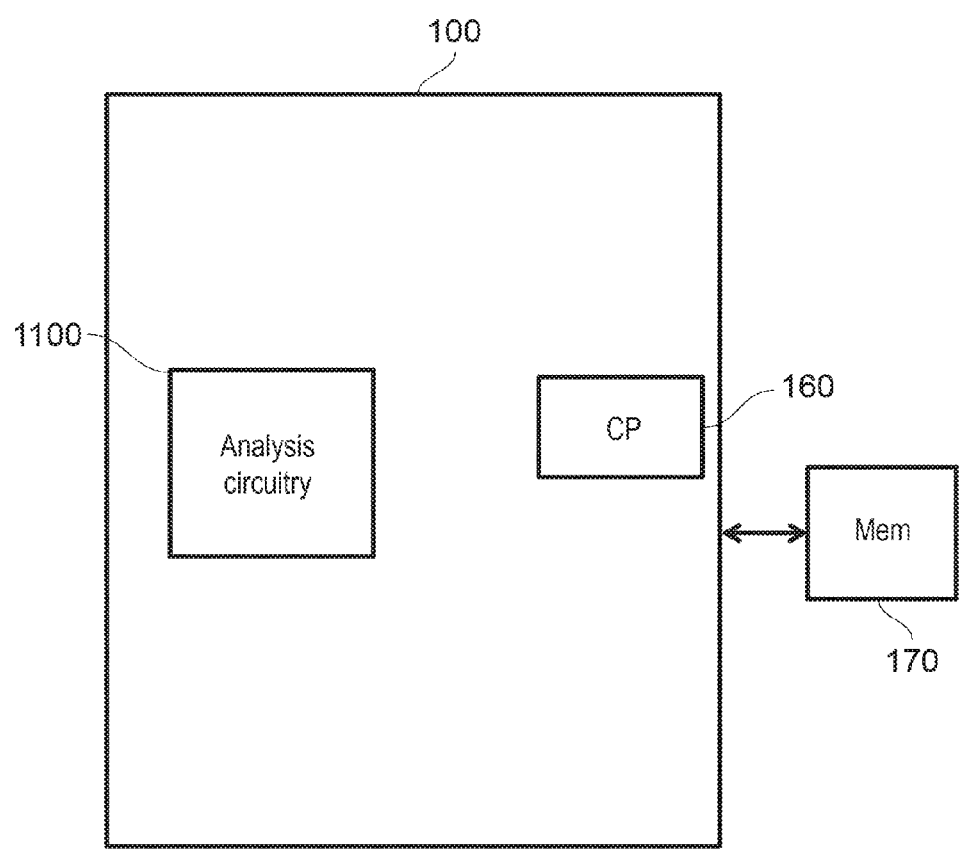

FIG. 11 illustrates an embodiment in which analysis circuitry 1100 is used to analyse resource allocations after the execution of software. During execution of the software, a data structure is used to record each resource allocation that is made, together with a value stored in the call path identifier register 160. Such a data structure is stored within main memory 170 and, in this embodiment, relate to allocations of blocks of memory. Whenever allocations are deleted, i.e. the resource is freed, the data structure is updated to remove the allocation. Once the software ends, the data structure is analysed by the analysis circuitry and the call path identifier associated with each remaining resource allocation is output. This output represents allocations that were never freed and could represent, for example, the sources of memory leaks or blocked resources.

Figure 12:
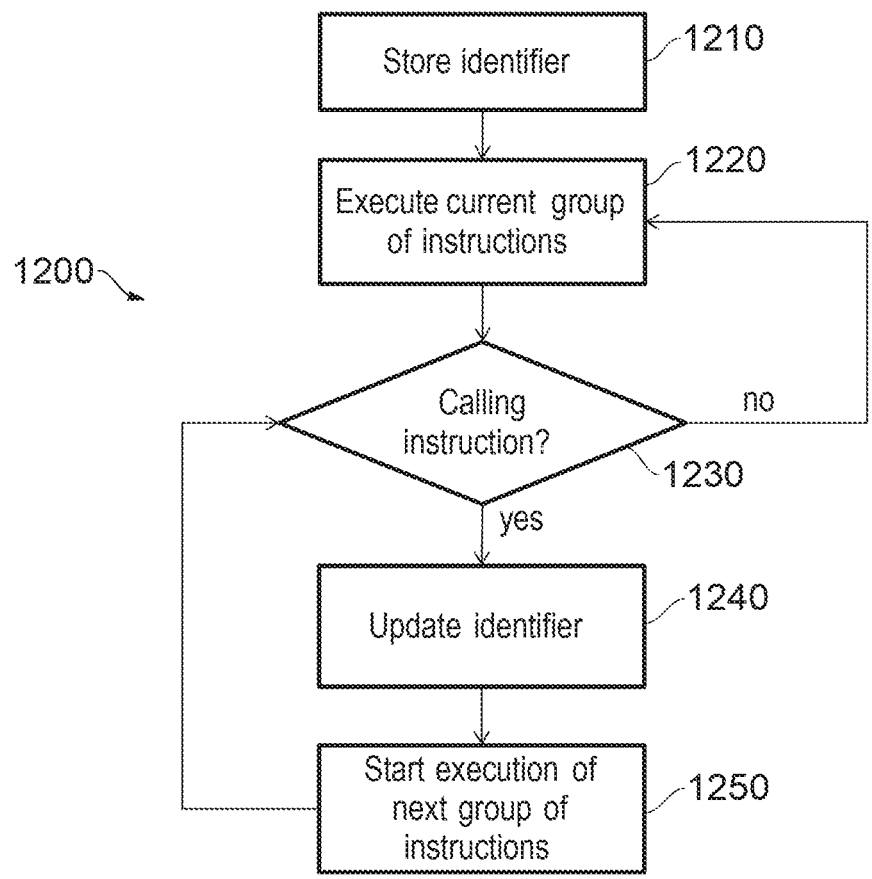
FIG. 12 schematically illustrates, in flowchart form, a data processing method in accordance with one embodiment.

FIG. 12 illustrates, in flowchart 1200 form, a method of data processing in accordance with one embodiment. The process begins at step 1210 in which an identifier of the current call path is stored. For example, this can be stored in a call path identifier register 160 as previously discussed. At a step 1220, execution of the current group of instructions proceeds. At step 1230, it is determined whether a calling instruction is encountered or not. A calling instruction is one that causes a change in the flow of execution of the program by virtue of proceeding to another function. If not, the process loops back around to step 1220. In other words, the current group of instructions is executed until such a calling instruction is encountered. Once an instruction is encountered, the process proceeds to step 1240 in which the call path identifier is updated to reflect the changing call path. Execution of the next group of instructions then starts at step 1250. The process then returns to step 1230 where it is determined whether or not the current instruction is calling instruction. If so, the process proceeds to step 1240 as before. Otherwise, the next instruction in what is now the current group of instructions is executed at step 1220.

Figure 13:
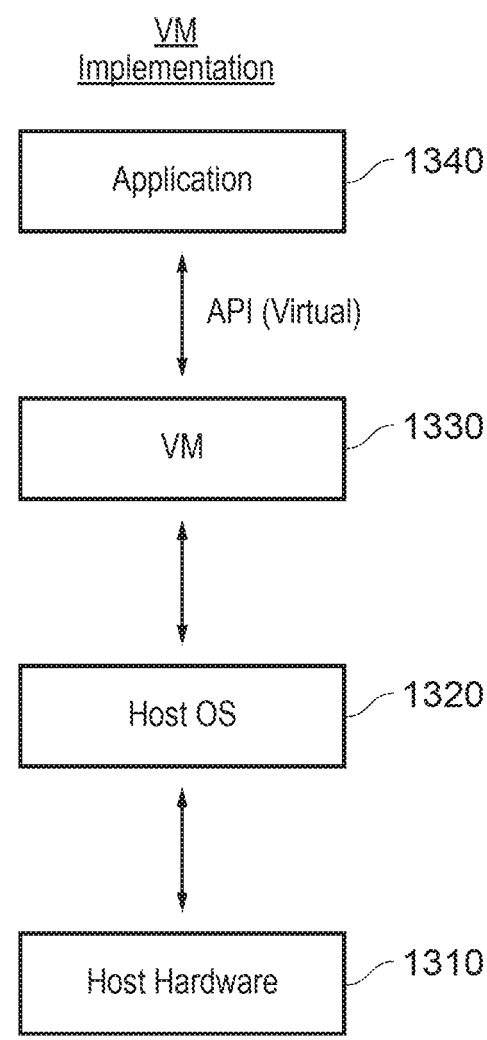
FIG. 13 shows a virtual machine implementation that may be used.

FIG. 13 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 1310 typically running a host operating system 1320 supporting a virtual machine program 1330. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 1330 is capable of executing an application program (or operating system) 1340 to give the same results as would be given by execution of the program by a real hardware device. Thus, the program instructions, including the control of memory accesses described above, may be executed from within the application program 1340 using the virtual machine program 1330.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. A data processing apparatus comprising:
   call path storage circuitry to store an identifier of a call path; and
   processing circuitry to execute a current group of instructions from a plurality of groups of instructions, wherein said processing circuitry is responsive to a calling instruction to:
      cause said processing circuitry to start executing, in dependence on said calling instruction, a next group of instructions from said plurality of groups of instructions such that said current group of instructions is added to said call path, and
      cause said call path storage circuitry to update said identifier of said call path, on the basis of said call path, using a compression algorithm.

2. A data processing apparatus according to claim 1, further comprising:
   return address storage circuitry to store a return address identifier associated with a previous group of instructions, wherein
   said processing circuitry is further responsive to said calling instruction to cause said return address storage circuitry to store a return address identifier associated with said current group of instructions; and
   said identifier of said call path is updated based on said return address identifier.

3. A data processing apparatus according to claim 2, wherein
   said return address storage circuitry is a link register.

4. A data processing apparatus according to claim 1, wherein
   said processing circuitry is responsive to a returning instruction to:
      cause said processing circuitry to resume executing, in dependence on said calling instruction, a previous group of instructions from said plurality of groups of instructions such that said current group of instructions is removed from said call path, and
      cause said call path storage circuitry to update said identifier of said call path based on said call path.

5. A data processing apparatus according to claim 1, wherein
   said compression algorithm comprises a digest algorithm.

6. A data processing apparatus according to claim 1, wherein
   said compression algorithm is unwindable.

7. A data processing apparatus according to claim 5, wherein
   said digest algorithm comprises a Feistel network that uses said digest algorithm.

8. A data processing apparatus according to claim 1, wherein
   said identifier of said call path at least pseudo-uniquely identifies said call path.

9. A data processing apparatus according to claim 1, wherein
   said identifier of said call path uniquely identifies said call path.

10. A data processing apparatus according to claim 1 further comprising:
    further storage circuitry, wherein
    said processing circuitry is responsive to a context switch operation to:
       save said identifier of said call path from said call path storage circuitry to said further storage circuitry; and
       restore a further identifier of a further call path from said further storage circuitry to said call path storage circuitry.

11. A data processing apparatus according to claim 5, further comprising:
    access circuitry to control access to said call path storage circuitry, wherein
    said digest algorithm is a cryptographic digest algorithm;
    said processing circuitry is to operate in a current privilege mode out of a plurality of privilege modes; and
    said access circuitry controls access to said call path storage circuitry dependent on a current privilege mode of said processing circuitry.

12. A data processing apparatus according to claim 11, wherein
    when said processing circuitry accesses said access circuitry whilst said current privilege mode is less than a predefined privilege mode, said access circuitry is to provide an encrypted version of said identifier of said call path instead of said identifier of said call path.

13. A data processing apparatus according to claim 12, wherein
    when said processing circuitry accesses said access circuitry whilst said current privilege mode is greater than or equal to said predefined privilege mode, access circuitry is to provide said identifier of said call path and said encrypted version of said identifier of said call path.

14. A data processing apparatus according to claim 1, wherein
    said next group of instructions comprises a subset of instructions that compares said identifier of said call path to one or more permitted identifiers associated with said next group of instructions; and
    in response to said identifier of said call path corresponding with none of said one or more permitted identifiers, said processing circuitry triggers an error handling response.

15. A data processing apparatus according to claim 1, further comprising:
    analysis circuitry to analyse a data structure comprising a set of resource allocations and for each resource allocation in said set, to output an associated identifier of a call path, wherein said processing circuitry is responsive to an allocation instruction to store a resource allocation in association with said identifier of said call path, in said set of resource allocations; and said processing circuitry is responsive to a deallocation instruction to remove a resource allocation from said set of resource allocations.

16. A data processing apparatus according to claim 1, further comprising:

configuration storage circuitry to store one or more parameters that define a behaviour of said processing circuitry; and tuning circuitry to alter said one or more parameters, wherein said processing circuitry executes instructions in said plurality of groups of instructions in accordance with said behaviour; and said tuning circuitry alters said one or more parameters in dependence on said identifier of said call path.

17. A data processing apparatus according to claim 1 wherein said processing circuitry is to perform a debugging process on software comprising said plurality of groups of instructions; and said processing circuitry is responsive to a breakpoint event to compare said identifier of said call path to one or more breaking identifiers and, in response to said identifier corresponding with one of said one or more breaking identifiers, suspending execution of said software.

18. A data processing apparatus according to claim 1, further comprising:

performance measuring circuitry to provide a performance metric related to execution of said current group of instructions by said processing circuitry while said identifier of said call path has a specific value; and further storage circuitry to store said performance metric in association with said specific value.

19. A data processing apparatus according to claim 1, cache circuitry for storing a plurality of counters each associated with a call path, wherein said cache circuitry is indexed by said identifier of said call path;

profile circuitry to determine, each period, said identifier of said call path, to index into said cache with said identifier of said call path to obtain a counter associated with said call path, and to increment said counter associated with said call path, wherein when said identifier lacks an entry in said cache, said processing circuitry performs a stack walk in order to determine said call path and updates said cache circuitry to store a counter in association with said call path.

20. A data processing method comprising the steps:

storing an identifier of a call path;

executing a current group of instructions from a plurality of groups of instructions; and in response to a calling instruction:

executing, in dependence on said calling instruction, a next group of instructions from said plurality of groups of instructions such that said current group of instructions is added to said call path, and updating said identifier of said call path, on the basis of said call path, using a compression algorithm.

* * * * *